United States Patent [19]
Torii

[11] Patent Number: 5,563,786
[45] Date of Patent: Oct. 8, 1996

[54] AUTONOMOUS RUNNING CONTROL SYSTEM FOR VEHICLE AND THE METHOD THEREOF

[75] Inventor: Tsuyoshi Torii, Tokyo, Japan

[73] Assignee: Fuji Jukogyo Kabushiki Kaisha, Tokyo, Japan

[21] Appl. No.: 383,082

[22] Filed: Feb. 2, 1995

[30] Foreign Application Priority Data

Feb. 16, 1994 [JP] Japan ................................. 6-019642

[51] Int. Cl.$^6$ .............................................. G06F 165/00
[52] U.S. Cl. ................... 364/424.02; 364/449; 364/450; 342/457
[58] Field of Search .............................. 364/424.02, 449, 364/450; 180/167, 168; 342/357, 457; 318/587, 581

[56] References Cited

U.S. PATENT DOCUMENTS

| | | | |
|---|---|---|---|
| 3,425,197 | 2/1969 | Kita | 56/26 |
| 3,924,389 | 12/1975 | Kita | 56/10.2 |
| 4,694,639 | 9/1987 | Chen et al. | 56/10.2 |
| 5,107,946 | 4/1992 | Kamimura et al. | 180/169 |
| 5,334,986 | 8/1994 | Fernhout | 342/357 |
| 5,359,521 | 10/1994 | Kyrtsos et al. | 364/449 |
| 5,375,059 | 12/1994 | Kyrtsos et al. | 364/449 |
| 5,390,124 | 2/1995 | Kyrtsos | 364/449 |
| 5,394,333 | 2/1995 | Kao | 364/450 |
| 5,416,712 | 5/1995 | Geier et al. | 364/450 |
| 5,469,158 | 11/1995 | Morita | 340/988 |

FOREIGN PATENT DOCUMENTS 63-247612 10/1988 Japan .
2-132321 5/1990 Japan .

*Primary Examiner*—Michael Zanelli
*Attorney, Agent, or Firm*—Martin A. Farber

[57] ABSTRACT

The position of the vehicle is detected by the position information from satellites and by the correction information based on the position data of a known point. On the other hand, the position of the vehicle is found based on the running histories since the reference point. Next, the difference between the position data from satellites and the position data based on the running histories at each moment when the position data is received from satellites is calculated and those differences are averaged to obtain a correction value. Finally the current position of the vehicle is calculated by correcting the position data based on the running histories by the newest correction value. Consequently, in the autonomous running control system an accurate position of the vehicle can be found without stopping the vehicle, even when the position data from satellites does not have a sufficient accuracy. Thus, according to the present invention an efficient and accurate autonomous running can be achieved.

4 Claims, 12 Drawing Sheets

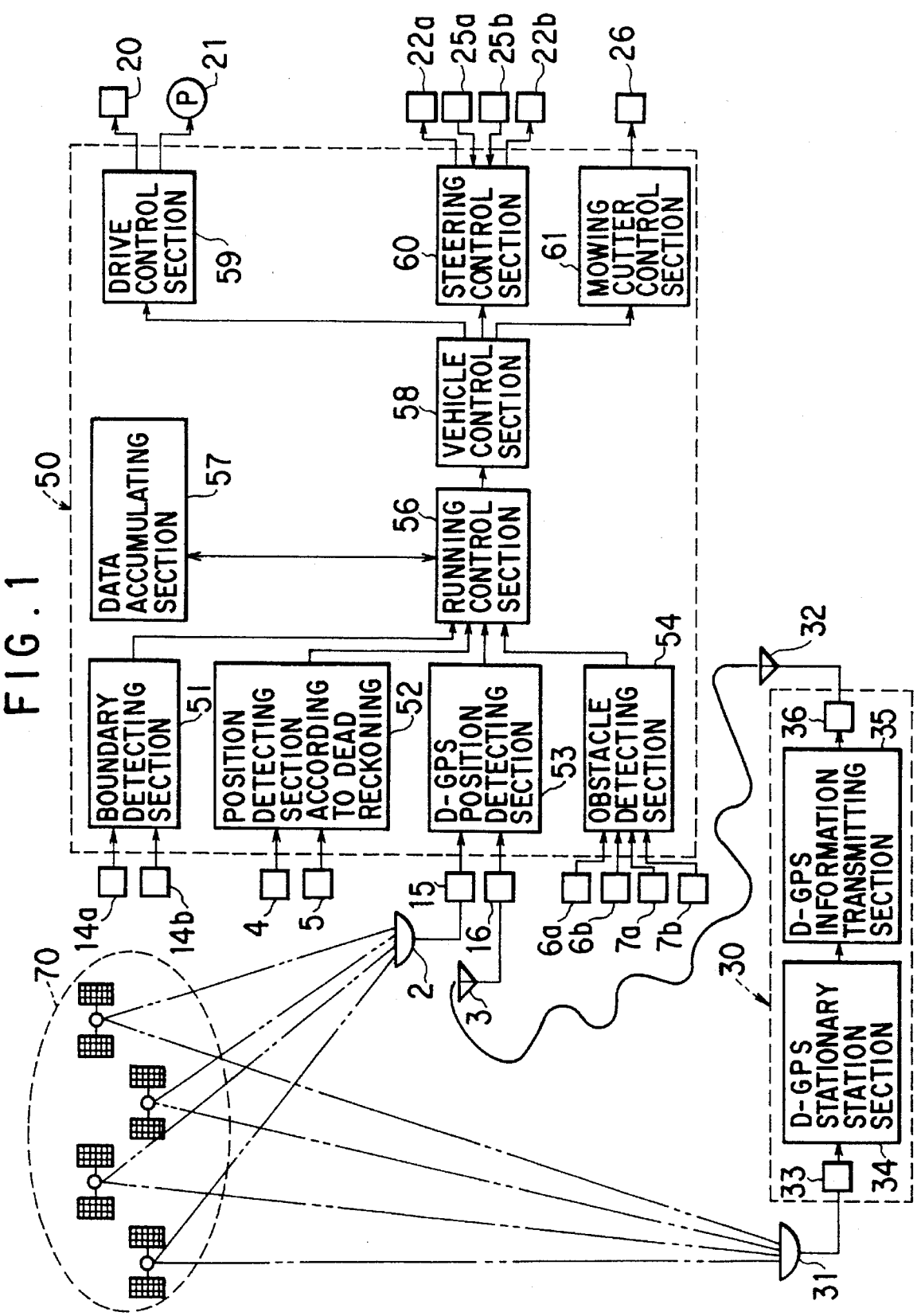

MOWED AREA

UNMOWED AREA

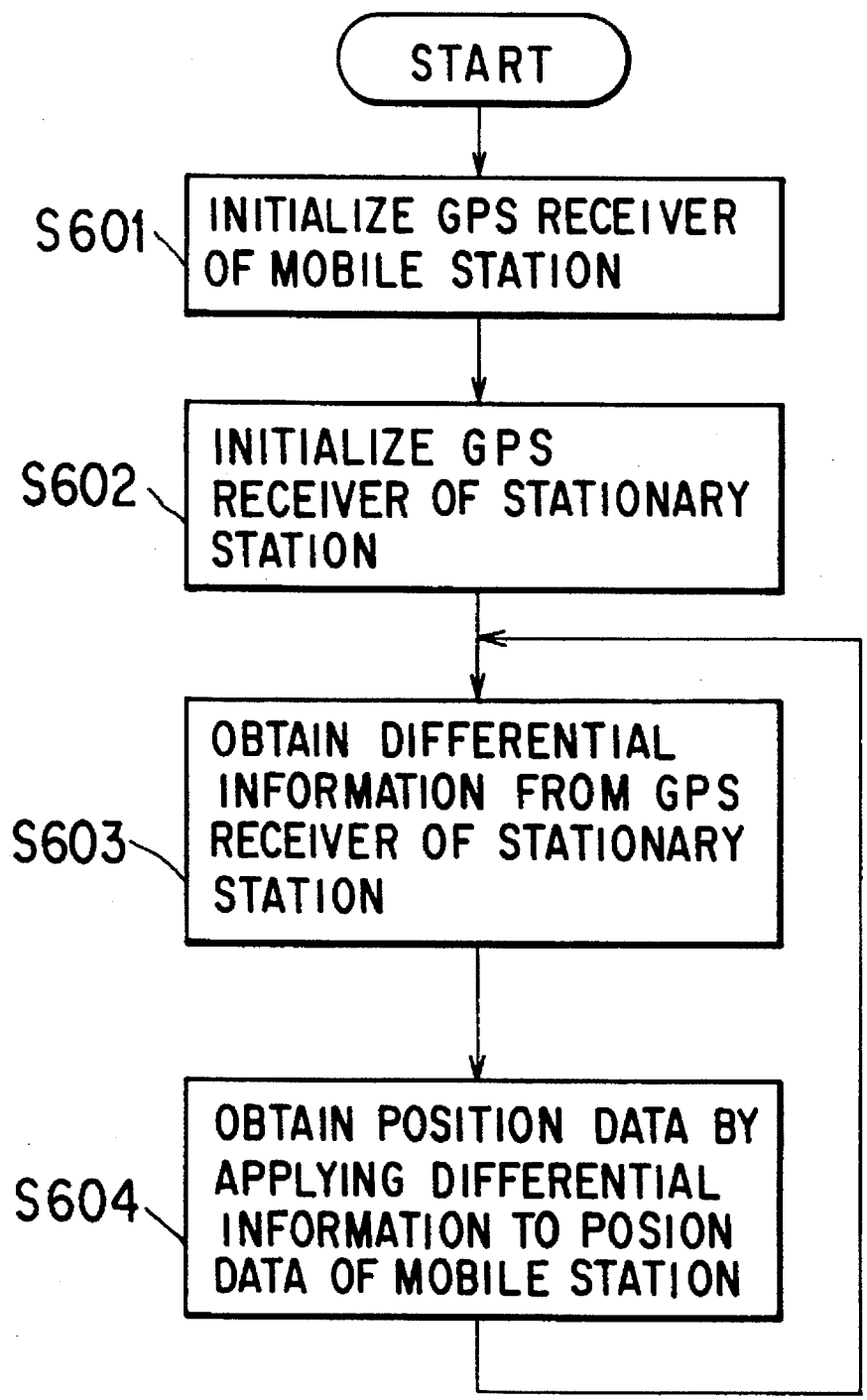

5,563,786

AUTONOMOUS RUNNING CONTROL SYSTEM FOR VEHICLE AND THE METHOD THEREOF

BACKGROUND OF THE INVENTION

1. Technical Field

The present invention relates to an autonomous running control system for vehicle and the method thereof and more specifically to the control system and method of an unmanned vehicle which can be operated by finding a position by itself based on radio waves from satellites.

2. Related Prior Arts

In autonomous controlled off-road vehicles used for mowing lawn or grasses in golf courses, parks, gardens or other miscellaneous fields, techniques for finding correctly the position where they are located are important in autonomous running.

Among those techniques, Japanese Patent Application Laid Open No. Toku-Kai-Sho 63-247612 discloses a technique for finding a vehicular position by receiving a radio wave transmitted from a satellite and further No. Toku-Kai-Hei 2-132321 discloses a technique using a dead reckoning navigation method by which the location of a vehicle is estimated from a running distance and a running direction.

However, the former technique lacks an accuracy for positioning, when it is applied to an autonomous controlled vehicle which travels within a relatively narrow range, because of a clock error of the satellite and the receiver, a delay of radio wave caused by ionized layer, and a delay of radio wave affected by atmosphere.

Further, in the latter technique there is such a disadvantage that errors are accumulated with an increase of running distance.

SUMMARY OF THE INVENTION

It is an object of the present invention to provide an autonomous control system for vehicle which can be operated with high accuracy and high efficiency by means of always correcting the position data by the dead reckoning navigation method based upon the position data from the satellite without stopping the vehicle.

Disclosed is an autonomous vehicular control system comprising:

a stationary station for receiving radio waves from a plurality of satellites at a stationary point where a position is known and for finding a position at the stationary point based on the radio waves;

differential information calculating means for calculating a difference between the position at the stationary point based on the radio waves and the known position in the stationary station and outputting the difference as a difference information;

differential information transmitting means for transmitting the difference information from the stationary station to the autonomous running control system of the vehicle;

first position finding means for receiving the radio waves from the plurality of satellites and for finding a first position at a point where the vehicle is running;

differential information receiving means for receiving the difference information from the stationary station;

first corrected position finding means for finding a corrected first position at the point where the vehicle is running based on the first position and the differential information;

running history detecting means for detecting a running history of the vehicle;

second position finding means for finding a second position at the point where the vehicle is running based on the detected running history at the moment when the radio waves are received from the satellites;

differential values calculating means for calculating a differential value between the corrected first position and the second position at each moment when the radio waves are received;

correction value calculating means for producing a correction value by averaging a predetermined number of the differential values; and final position finding means for finding a final position where the vehicle is currently located by correcting the second position with the correction value.

In the vehicular autonomous running control system thus constituted, a stationary station receives radio waves from a plurality of satellites at a stationary point where a position is known and finds a position at the stationary point based on the radio waves. In the stationary station differential information calculating means calculate a difference between the position at the stationary point based on the radio waves and the known position and output the difference as a difference information. Further, differential information transmitting means transmit the difference information from the stationary station to the autonomous running control system of the vehicle. On the other hand, first position finding means receive the radio waves from the plurality of satellites and find a first position at a point where the vehicle is running. Further, differential information receiving means receive the difference information from the stationary station. First corrected position finding means find a corrected first position at the point where the vehicle is running based on the first position and the differential information. Running history detecting means detect a running history of the vehicle. Second position finding means find a second position at the point where the vehicle is running based on the running history at the moment when the radio waves are received from the satellites. Further, differential values calculating means calculate a differential value between the corrected first position and the second position at each moment when the radio waves are received from the satellites. Correction value calculating means produce a correction value by averaging a predetermined number of the differential values. Finally, final position finding means find a final position where the vehicle is currently located by correcting the second position with the correction value.

BRIEF DESCRIPTION OF THE DRAWINGS

FIG. 1 is a block diagram showing a control system according to the present invention;

FIG. 13 is a flowchart showing a radio wave communication routine according to D-GPS.

DETAILED DESCRIPTION OF PREFERRED EMBODIMENTS

Figure 2A:
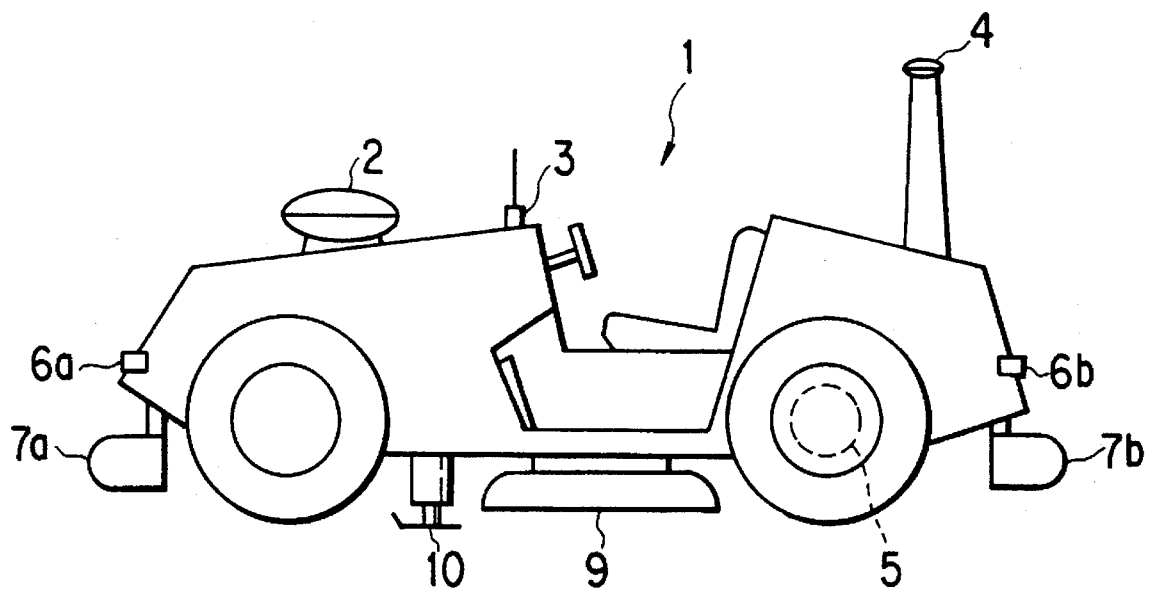
FIG. 2a is a schematic view showing a lawn mower equipped with a mobile station for D-GPS.

Referring now to FIG. 2a, numeral 1 shows an autonomous controlled vehicle capable of an unmanned operation and more specifically a vehicle for mowing lawn in a golf course and the like. The vehicle 1 is propelled by an engine and its front and rear wheels can be independently controlled respectively. The autonomous controlled vehicle 1 is equipped with a receiver for receiving a satellite radio wave, a dead reckoning navigation sensor to find a current position based on the past running trace, a sensor for detecting an obstacle, a sensor for detecting a boundary between mowed and unmowed area and the like.

The radio receiver according to this embodiment is a GPS (Gloval Positioning System) receiver for finding a position by receiving a radio wave from a GPS satellite and more specifically is a GPS receiver for mobile station based on a so-called Differential Global Positioning System (hereinafter referred to as D-GPS). The D-GPS is a positioning system in which a correction information (differential information) obtained at a stationary station is feedbacked.

As well known, the positioning error in GPS is caused by a clock error in a satellite or a receiver, an orbital error of the satellite, a delay of radio wave due to ionized layer, a delay of radio wave by atmosphere, multi-pass, an artificially degraded accuracy called a Selectable Availability (S/A) and the like. Among errors caused by these causes an error with the same phase can be eliminated by way of using correction information corresponding to an individual satellite and the positioning accuracy at the mobile station can be remarkably improved up to a couple of meters.

Figure 2B:
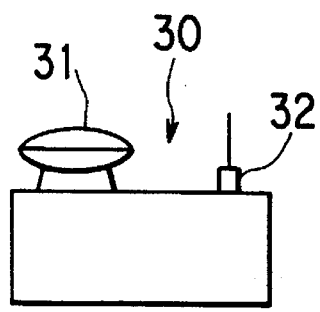
FIG. 2b is a schematic view showing a stationary station for D-GPS.

The vehicle 1 is equipped with an antenna 2 of the GPS receiver for mobile station, an antenna 3 of the wireless communication device for receiving differential information from the stationary station. On the other hand, at a known point located outside of the vehicle a stationary station 30 which is equipped with an antenna 31 of the GPS receiver for stationary station and an antenna 32 of the wireless communication device for transmitting differential information to the GPS receiver for mobile station as shown in FIG. 2b.

Further, the vehicle 1 is equipped with an earth magnetism sensor 4 and a wheel encoder 5 for the dead reckoning navigation. As for an obstacle detecting sensor, contactless type sensors 6a and 6b such as ultrasonic sensors or optical sensors are mounted at the front and rear portion of the vehicle 1 and additionally contact type sensors 7a and 7b using microswitches and the like are mounted at the front and rear ends of the vehicle 1.

Further, under the floor of the vehicle 1 a mowing cutter mechanism 9 for mowing lawn or grasses and a boundary detecting mechanism 10 for detecting a boundary between mowed and unmowed areas.

Figure 3A:
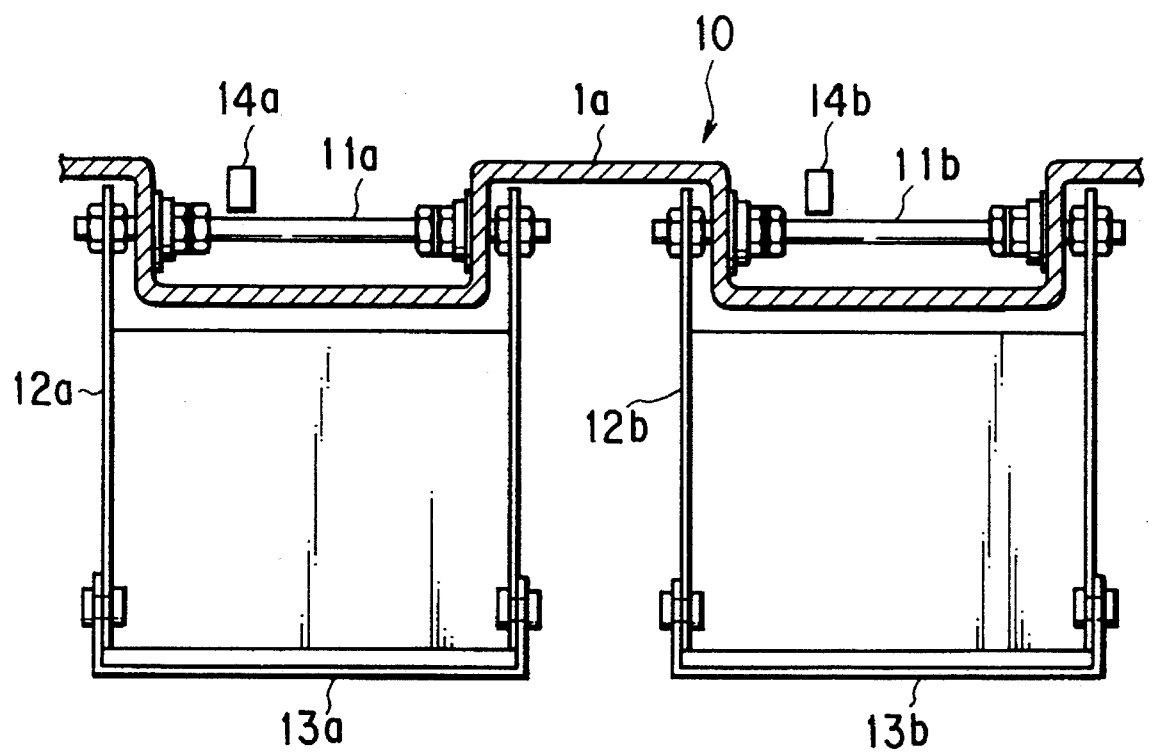
FIGS. 3a and 3b are views showing a mechanism for detecting a boundary between mowed and unmowed area.
Figure 3B:
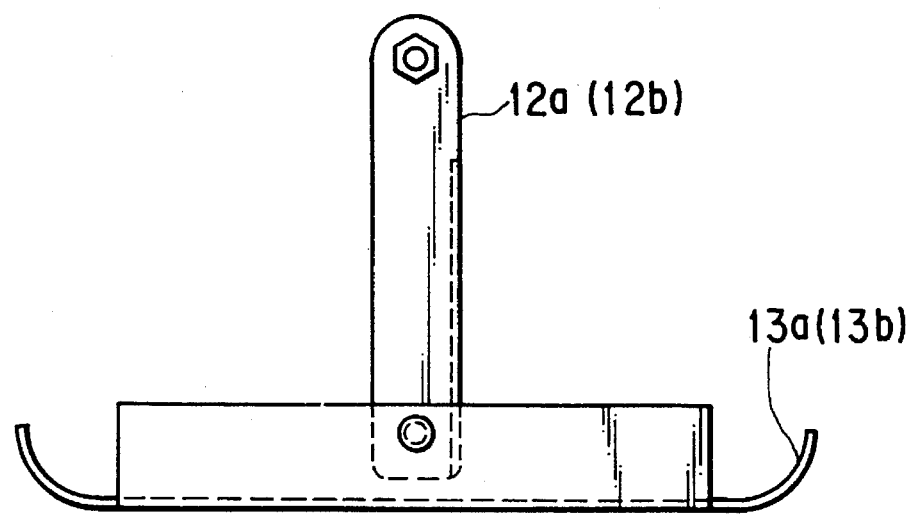

As shown in a front view of FIG. 3a and a side view of FIG. 3b, the boundary detecting mechanism 10 is composed of two pairs of swinging sled mechanisms which are provided under a floor member 1a of the vehicle 1 and disposed side by side in the transverse direction thereof. Each swinging sled mechanism comprises two pairs of swing arms 12a (12b) which swing around an axis 11a (11b) fixed to the floor member 1a of the vehicle 1 and a sled 13a (13b) pivotably connected to the lower ends of the swing arms 12a (12b). The sled 13a (13b) moves vertically according to the height of grass or lawn. The sled 13a (13b) is made so right as not to trample down grasses or lawn. With the vertical movement of the sled 13a (13b), the swing arms 12a (12b) rotate around the axis 11a (11b) and the rotating angle of the swing arms 12a (12b) is detected by a rotating angle sensor 14a (14b).

Referring to FIG. 1, the autonomous controlled vehicle 1 is equipped with a control device 50 comprising a microcomputer and other devices. The control device 50 is connected to miscellaneous sensors, miscellaneous actuators, a GPS receiver 15 for mobile station and a wireless communication device 16. The control device 50 has following functions: firstly finding a position of the vehicle based on position information received from a satellite and correction information received from a stationary station 30 and outputting a position data of the vehicle; secondly calculating the running history from a given point and outputting a position data of the vehicle based on the calculated running history; thirdly calculating a correction value from the difference between the position data at a clock time according to the above first function and the position data at the same clock time according to the above second function; fourthly calculating a present position of the vehicle by means of correcting the position data according to the second function by the above correction value according to the third function and outputting the present position data; and finally controlling the vehicle operation based on the above calculated position data according to the fourth function.

Describing more in detail, in the control device 50 there are provided with a boundary detecting section 51 which is connected to the rotating angle sensors 14a and 14b of the boundary detecting mechanism 10, a position detecting section 52 according to the dead reckoning navigation which is connected to the geomagnetic sensor 4 and the wheel encoder 5, a D-GPS position detecting section 53 which is connected to the GPS receiver 15 for mobile station and the wireless communication device 16, an obstacle detecting section 54 which is connected to the contactless type sensors 6a and 6b and the contact type sensors 7a and 7b, a running control section 56 which is connected to these detecting sections 51, 52, 53 and 54, a data accumulating section 57 in which miscellaneous data maps needed for field works are accumulated, a vehicle control section 58 for controlling the vehicle based on the command signals from the running control section 56, additionally order to drive miscellaneous mechanisms of the vehicle 1, a drive control section 59, a steering control section 60 and a mowing cutter control section 61.

Figure 4A:
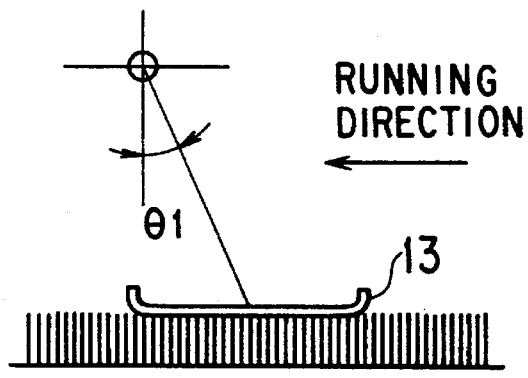
FIGS. 4a and 4b are views showing an operation of the mechanism for detecting a boundary between mowed and unmowed area.
Figure 4B:
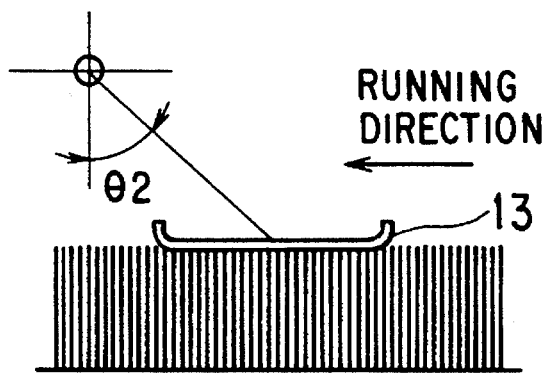

In the boundary detecting section 51 a boundary between mowed and unmowed areas is detected by processing the rotating angle signals according to the heights of grasses or lawns from the rotating angle sensors 14a and 14b of the boundary detecting mechanism 10. That is to say, as illustrated in FIG. 4 (a) and FIG. 4 (b), where $\eta_1$ is a rotating the swing arm 12a and $\theta_2$ is a rotating angle of the swing arm 12b, the rotating angle sensors 14a and 14b detect $\theta_1$ and $\theta_2$ respectively. When the difference between $\eta_1$ and $\theta_2$ exceeds a predetermined value, it is judged that the vehicle is running on a boundary between mowed and unmowed areas and the position data of that position is outputted to the running control section 56.

In the position detecting section 52 according to the dead reckoning navigation, the vehicle speed detected by the wheel encoder 5 is integrated to obtain the running distance and at the same time the running direction is detected by the geomagnetic sensor 4. Then the running distance involving the running direction is obtained and accumulated from the start point where the position is already known to the current point. Based on this accumulated distance involving the running direction, the current position is found and the position data of the current position is outputted to the running control section 56.

In the embodiment the geomagnetic sensor is used for detecting the running direction of the vehicle but other sensor such as a gyroscope may be used in place of the geomagnetic sensor.

In the D-GPS position detecting section 53 the position of the vehicle is obtained based on the navigation messages from a plurality of satellites 70, namely correction factors of satellite clocks, orbital information, calender of satellites, positions of satellites and the like and on the differential information from the stationary station 30. The number of satellites needed for this purpose is at least four in case of three dimensional positioning and at least three in case of two dimensional positioning. Thus obtained position data is outputted to the running control section 56.

The stationary station 30 is composed of a GPS receiver 33 for stationary station, a D-GPS stationary station section 34 communicated from the GPS receiver 33, a D-GPS information transmitting section 35 for transmitting the differential information received from the D-GPS stationary station section 34 and a wireless communicating device 36 communicated from the D-GPS information transmitting section 35.

In the D-GPS stationary station section 34, the position information received from satellites 70 through the GPS receiver 33 is processed into differential correction data. The differential correction data are transformed into the packet data for wireless communication and transmitted through the wireless communication device 36.

In the embodiment the D-GPS stationary station 30 is described as an exclusive use for the autonomous controlled vehicle 1, however existing D-GPS stationary stations for general use may be employed for this purpose.

On the other hand, in the obstacle detecting section 54 the contact less type sensors 6a and 6b and the contact type sensors 7a and 7b detect obstacles and the detected signal is outputted to the running control section 56.

In the running control section 56 the detected signal by the boundary detecting section 51 and the position data from the position detecting section 52 according to the dead reckoning navigation and the D-GPS position detecting section 53 are selectively processed by referring to the miscellaneous data stored in the data accumulating section 57 and the deviation amount of the current position from the target position is calculated. Thus, the running routes of the vehicle 1 and miscellaneous commands thereto are determined.

When the vehicle 1 moves to the work area, the positional correction values are calculated based on the difference between the position data from the D-GPS position detecting section 53 and the position data from the position detecting section 52 according to the dead reckoning navigation and the current position is obtained by averaging these positional correction values. Thus the vehicle 1 runs autonomously confirming the current position of itself.

When the vehicle 1 is in the work area, it runs primarily by using the data from the boundary detecting section 51. When an obstacle is found by the obstacle detecting section 54, the vehicle is commanded to avoid the obstacle or to stop running.

The data accumulating section 57 is composed of a ROM area wherein the fixed data are stored and a RAM area wherein the work data being executed currently are stored. In the ROM area, the geographical data of work areas are stored and in the RAM area the processed data from miscellaneous sensors, the position data by D-GPS, the position data by dead reckoning navigation, the intercorrection value data which will be described later, the current position data of the vehicle which are calculated based on the intercorrection data and the like are stored.

In the vehicle control section 58, the command from the running control section 56 is converted into a definite control value and then outputted to the drive control section 59, the steering control section 60 and the mowing cutter control section 61 respectively.

The drive control section 59 drives miscellaneous actuators such as a throttle actuator for controlling the output of the engine, a vehicle speed change actuator, a backward gear change actuator, a brake actuator and the like and also controls a hydraulic pump 21 to generate hydraulic pressure for driving miscellaneous devices.

The steering control section 60 makes a steering control (steering amount feedback control) based on the input signals from a steering angle sensor 25a for front wheels and a steering angle sensor 25b for rear wheels through a hydraulic control valve 22a for steering front wheels and a hydraulic control valve 22b for steering rear wheels.

Further, the mowing cutter control section 61 makes a servo control of a mowing cutter mechanism 9 through control valve 26 for mowing cutter.

Figure 5:
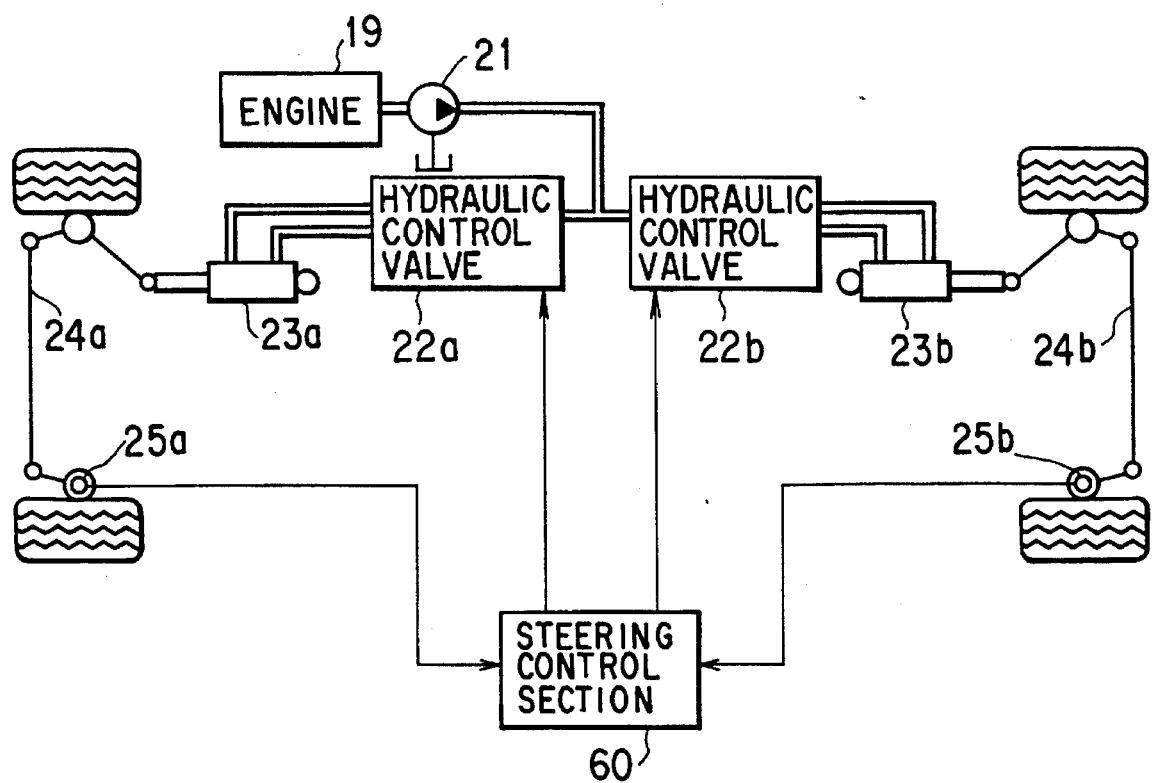
FIG. 5 is a schematic view showing a steering system.

Referring to FIG. 5, the steering system of the mowing vehicle 1 comprises the hydraulic pump 21 driven by an engine 19, the steering control section 60, the hydraulic control valve 22a for front wheels, the hydraulic control valve 22b for rear wheels, a hydraulic cylinder 23a for front wheels, a hydraulic cylinder 23b for rear wheels, a steering mechanism 24a for front wheels and a steering mechanism 24b for rear wheels. The hydraulic control valves 22a and 22b are controlled by the steering control section 60 and the steering mechanisms 24a and 24b are driven independently by the hydraulic cylinders 23a and 23b respectively.

When the steering angles detected by the steering angle sensors 25a and 25b are inputted to the steering control section 60, the steering mechanisms 24a and 24b are controlled by the steering control section 60 through the hydraulic valves 22a and 22b so as to minimize the difference between the detected steering angle and the target steering angle.

Figure 6:
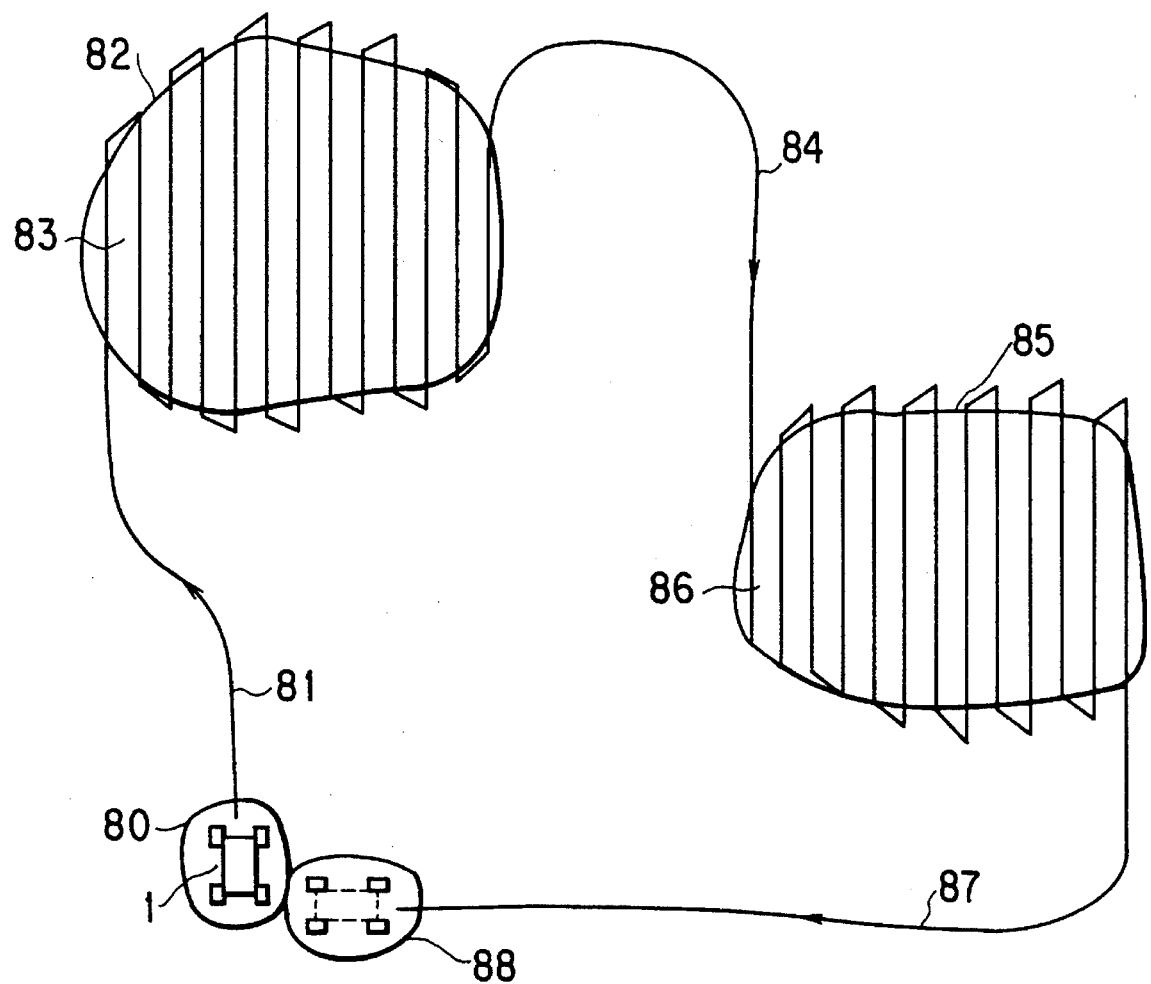
FIG. 6 is a schematic view illustrating an example of a traveling trace of a lawn mower.

With respect to a plurality of blocks for the work area as shown in FIG. 6, a case where the mowing vehicle makes an unmanned mowing operation will be described below.

First, the mowing vehicle I waits for starting to work at a preparation point 80. Next the vehicle starts for the first work area 82 and a mowing work is done there. Then, the vehicle moves to the next work area 85 and a mowing work is done there. After mowing work is finished, the vehicle returns to a return point 88. ALL operations during these are made autonomously according to main routines as shown in FIG. 7 and FIG. 8 and to a moving and running control routine as shown in FIG. 9.

Figure 7:
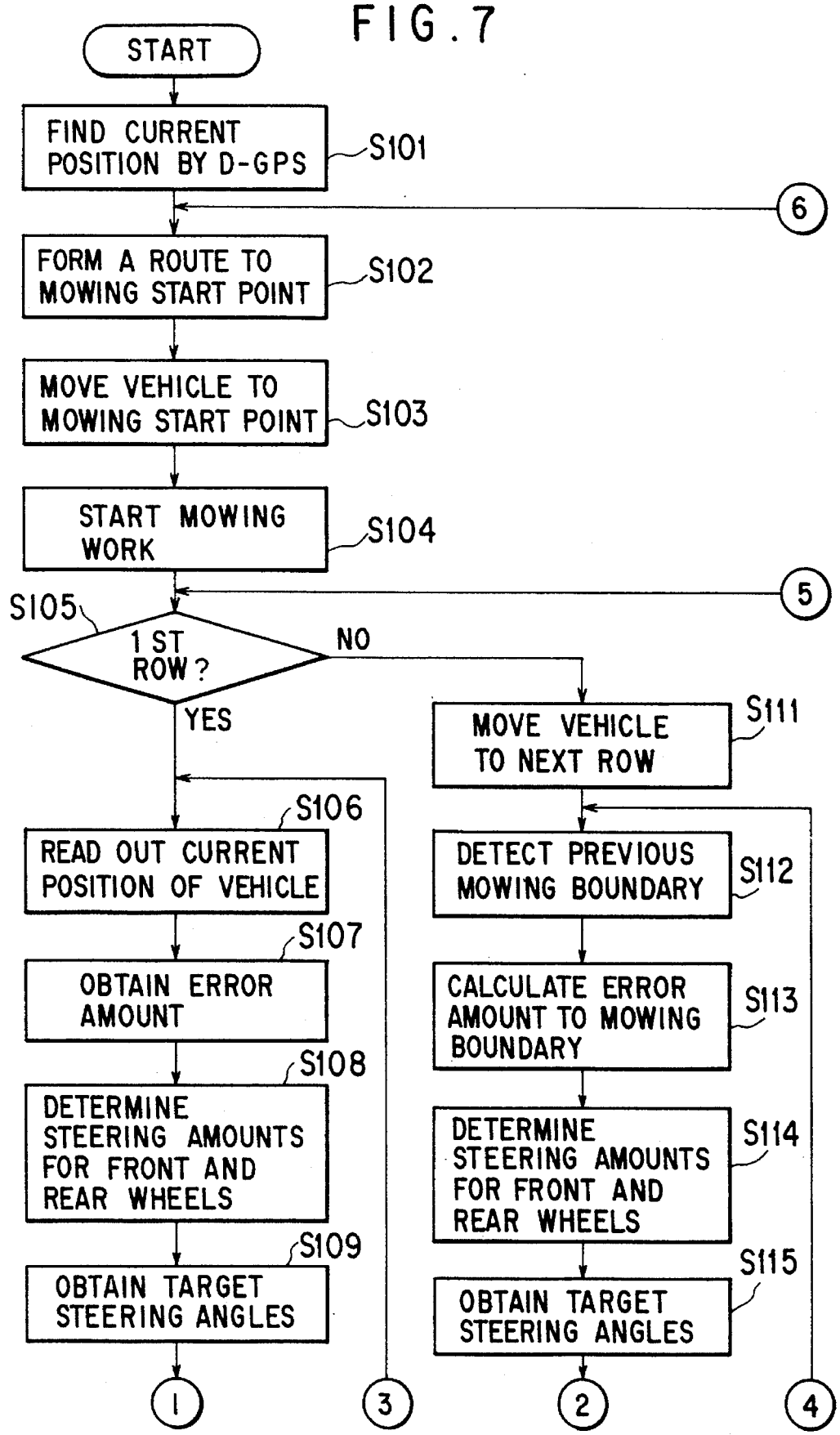
FIG. 7 is a flowchart showing a main control routine.
Figure 8:
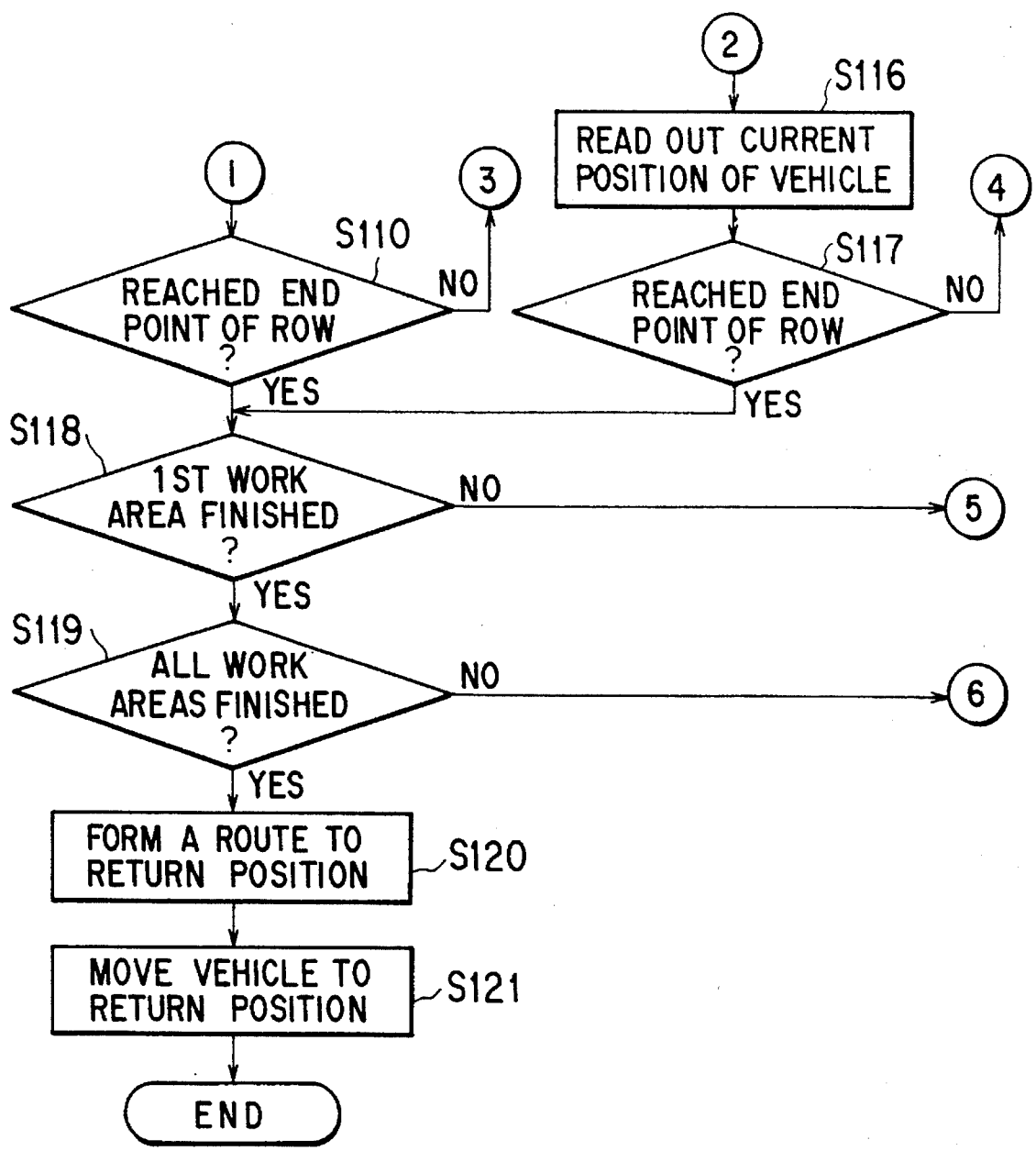
FIG. 8 is a flowchart showing a main control routine.
Figure 9:
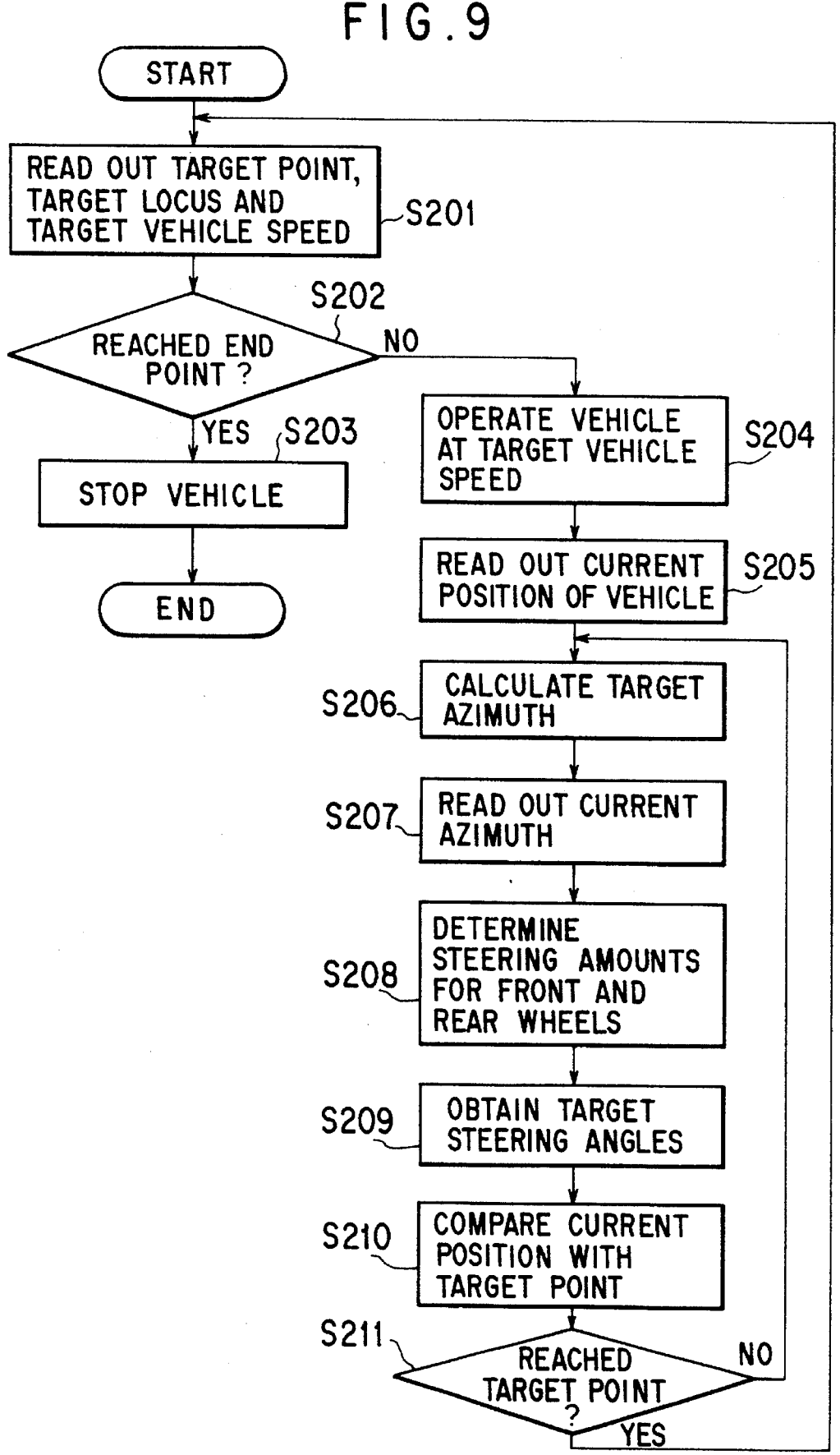
FIG. 9 is a flowchart showing a control routine for guiding a lawn mower to a work area.

Referring to a routine shown in FIG. 7 and FIG. 8, first at a step S101 the current position at the starting point 80 is found using the D-GPS. Since the position data found by the D-GPS is expressed as a combination of longitude and latitude (altitude too, if necessary), it is converted into the data of a local geographical system stored in the data accumulating section 57. This data conversion into a local geographical system may be made either in the D-GPS position detecting section 53 or in the running control section 56.

Next, the program steps to S102 where the topographical data of the first work area 82 are read and a route from the preparation point 80 to a mowing start point where the mowing work is started is formed. The program goes to S103 where the vehicle is moved to the start point according of the moving and running routine which will be described later. At S104 a mowing cutter control valve 26 is opened to feed hydraulic pressure to the mowing cutter mechanism 9 and then the mowing work is started. The mowing work is done at a constant speed (for example 3 to 6 km/h). The running speed at mowing is preferably 3 to 6 km/h because too low speed is not good for mowing efficiency and too high speed causes incomplete mowing.

Further, at S105 it is checked whether or not the current work is first time and if it is a first time the program goes to S106 where the current position according to the D-GPS and the dead reckoning navigation is read out from the data accumulating section 57. At S107 the amount of error of the current position to the route of the first process (first row) at the work area 82 is obtained by referring to the work data of the data accumulating section 57.

Next, at S108 the amount of steering with respect to each target steering angle for both front and rear wheels is determined according to the amount of error obtained at S107. Then at S109 the front wheel steering mechanism 24a and the rear wheel steering mechanism 24b are driven through the front wheel steering valve 22a and the rear wheel steering valve respectively so as to obtain the target steering angles while the front wheel steering angle and the rear wheel steering angle are detected respectively by the front wheel steering angle sensor 25a and the rear wheel steering angle sensor 25b.

After that, at S110 it is checked whether or not the vehicle reaches the end of the first process (first row) and if it does not the program returns to S106 to continue mowing work. If the vehicle reaches the end of the first process, at S118 it is judged whether or not the object mowing work at the work area is finished.

Since the current work is at the first process (first row), the program returns from S118 to S105 where it is checked again whether or not the work is at the first process. If it is not at the first process (it is at the second process or after), the program is diverted from S105 to S111 where the vehicle is shifted just by the width of the cutter and moved to the position from which the second process is started.

Figure 12:
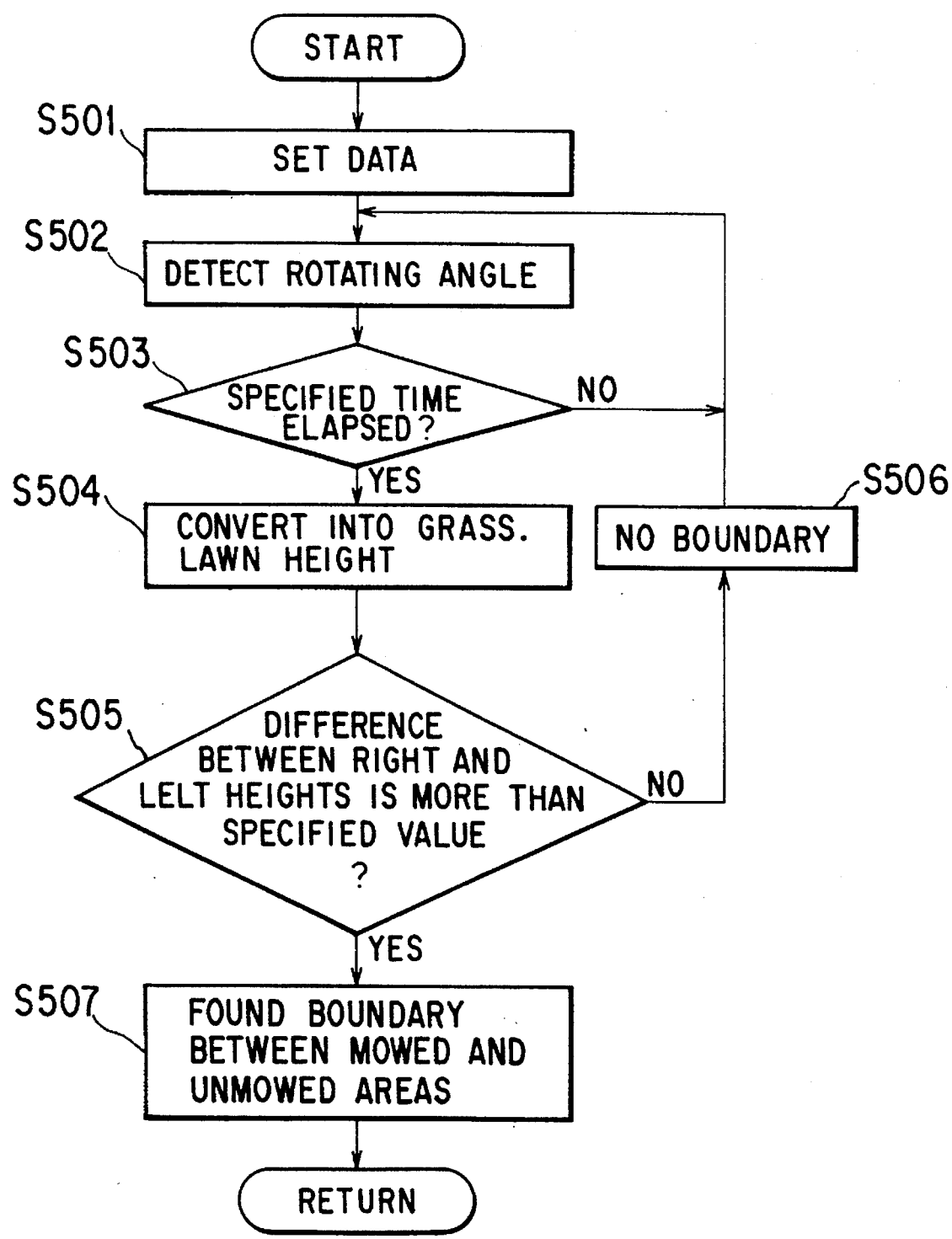
FIG. 12 is a flowchart showing a routine for detecting a boundary between mowed and unmowed area.

At S112 a boundary detecting routine which will be described later in FIG. 12 is carried out so as to detect a boundary between mowed and unmowed areas which has been produced at the last process based on the signals from the rotating angle sensors 14a and 14b of the boundary detecting mechanism 10. Further, at S113 the current position of the mowing vehicle and the detected boundary are compared and the amount of the error is obtained.

Then the program steps to S114 where the amount of steering of the front and rear wheels is determined so as to minimize the amount of the error. At this time the amount of steering is determined such that a predetermined amount of overlap at mowing is included therein. Next, at S115 the front steering mechanism 24a and the rear steering mechanism 24b are driven so as to obtain a target steering angle by controlling the front steering control valve 22a and the rear steering control valve 22b respectively.

After that at S116 the current position is read out from the data accumulating section 57 and at S117 it is checked whether or not the mowing process for that row reaches the end point. If it does not the program returns to the aforementioned step S12 to continue the mowing process along the boundary. If the mowing process reaches the end point for that row, the program goes to S18 where it is judged whether or not all mowing processes for the work area 82 are finished.

Further, the steps through S105 to S18 are repeated until all mowing processes for that work area 82 are finished. When all processes for the work area are finished, the program goes to S19 where it is judged whether or not the mowing processes for all work areas are finished.

In this case, since the mowing work at the next work area is not yet finished, the program returns to the aforementioned step S102 where a running route 84 from the work area 82 to the next work area 85 is formed in the same manner as described before. According to the moving and running routine shown in FIG. 9, the mowing vehicle moves to the next work area 85 where the first mowing process is done according to D-GPS/dead reckoning navigation and the mowing processes after first one are done according to the route 86 in the same manner in the work area 82.

When the mowing processes for all work areas are finished, the program goes from S119–S120 where a coming-back route 87 to the return point 88 is formed by referring to the data accumulating section 57 and then at S121 the vehicle moves to the return point 88 according to the moving and running routine. When the vehicle arrives at the return point 88, it comes to a standstill therein to terminate the program.

Referring to FIG. 9, this indicates a moving and running routine for controlling the mowing vehicle when it runs on the routes 81, 84 and 87.

In the embodiment, the main control routine is constituted such that the routes 81, 84 and 87 are formed by the position data of the vehicle and the work data in the data accumulating section 57, however in another way these routes themselves may be memorized in the data accumulating section 57 beforehand.

Generally, the D-GPS provides far better positioning accuracy than the single GPS but depending on the aiming condition of satellite or the receiving condition of radio wave, in some case a required positioning accuracy can not be obtained at a timing needed for autonomous running.

Therefore, this invention introduces a way of securing an accuracy by means of correcting the position data according to the dead reckoning navigation by using a positional correction value (intercorrection value) which is calculated based on the data obtained both from the D-GPS and the dead reckoning navigation.

Namely, at S201 a target point, a target locus and a target vehicle speed which are stored in the data accumulating section 57 are read out and at the next step S202 it is judged whether or not the vehicle reaches a moving end point. If it does, at S203 the vehicle is stopped and the routine is terminated. If it does not, the program goes to S204.

Figure 11:
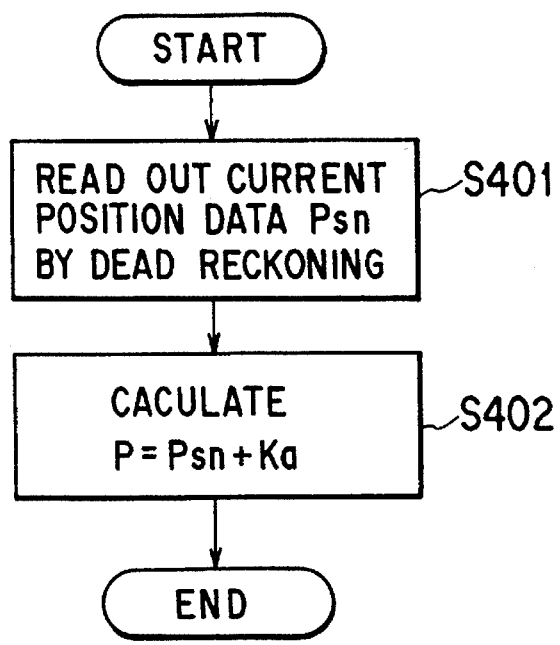
FIG. 11 is a flowchart showing a routine for calculating a position where the lawn mower is currently located.

At S204 the vehicle speed is detected by the wheel encoder 5 and an output of the engine 19 is controlled through a throttle actuator constituting the running control actuator 20 so as to operate the vehicle 1 at the designated vehicle speed. At S205 the current position of the vehicle obtained by the position calculating routine which will be described later in FIG. 11 is read out from the data accumulating section 57 and at S206 a target azimuth is calculated by comparing the current position with the target point.

Next, at S207 the current azimuth which is detected momentarily by the geomagnetic sensor 4 is read out and at S208 the amount of error of the current azimuth to the target azimuth is obtained and the amounts of steering for the front and rear wheels are determined respectively according to that amount of error. The program steps to S209 where the front steering mechanism 24a and the rear steering mechanism 24b are driven through the front steering control valve 22a and the rear steering control valve 22b so as to obtain the target steering angles.

After that, at S210 the current position is compared with the target position and at S211 it is judged whether or not the vehicle reaches the target point. If it does not, the program returns to S206 where the target azimuth is calculated again. If it does, the program returns to S201 where the target point, the target locus and the designated vehicle speed are read out again and the program is continued to be executed until it comes to an end of the routine.

Next, the way of how the current position of the vehicle is found will be described.

Figure 10:
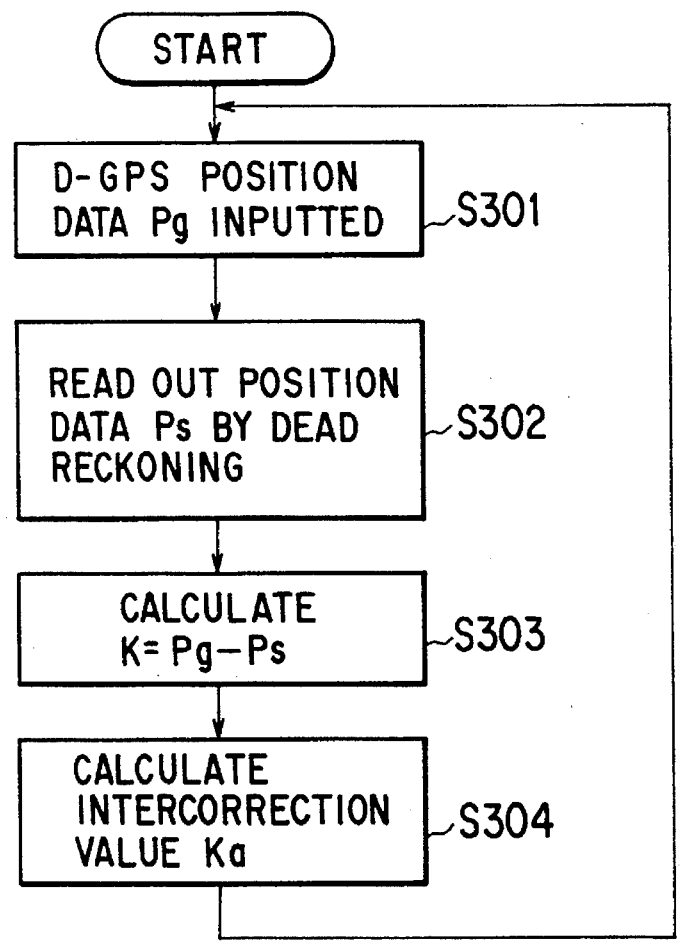
FIG. 10 is a flowchart showing a routine for calculating a correction value between a D-GPS method and a dead reckoning navigation method.

When the current position of the vehicle is found, the intercorrection value has been obtained beforehand based on the data according to the D-GPS and the dead reckoning navigation respectively by the intercorrection value calculating routine shown in FIG. 10. Then the current position is obtained using this intercorrection value by the current position calculating routine shown in FIG. 11.

First, the intercorrection value calculating routine will be described.

Since this routine is processed as a part of the main routine, the intercorrection value is updated into a newest value any time. At S301 the input of the position data Pg according to the D-GPS communication routine which will be described later is waited therein and when the position data Pg is inputted, the program goes to S302 where the position data Ps according to the dead reckoning is read out at the moment corresponding to the input time of the position data Pg.

Next, the program steps to S303 where the difference between the position data Pg according to D-GPS and the position data Ps according to the dead reckoning navigation is calculated (K=Pg−Ps K: intercorrection value). Further, next at S304 the new mean value Ka including the currently calculated K is calculated and the moving average value Ka which has been averaged over the past n points stored in the RAM area of the data accumulating section 57 is updated by this new moving average value Ka. Then the program returns to the aforementioned step S301 where the next input of the position data Pg is waited. Here, the value n is predetermined at an appropriate value according to the accuracy of the dead reckoning navigation, the size of errors accumulated and the like.

The updated intercorrection value Ka is read in the current position calculating routine shown in FIG. 11 wherein the current position is calculated.

That is to say, at S401 the current position data Psn according to the dead reckoning navigation is read out and next at S402 the current position P is obtained by adding the current position data Psn according to the dead reckoning navigation method to the updated intercorrection value Ka (P=Psn+Ka). Thus obtained current position data P is stored in the data accumulating section 57 and then the routine is returned to the main routine.

As described above, since the difference between the position data according to D-GPS and the one according to dead reckoning navigation is obtained as an intercorrection value, accumulated and the accumulated intercorrection values are subjected to the moving average process to produce a new intercorrection value, namely the accumulated intercorrection value is updated one after another while the vehicle changes its position, the position of the vehicle can be accurately calculated by way of correcting the position data according to the dead reckoning navigation with the updated newest intercorrection value, even when the positioning accuracy of the D-GPS goes down temporarily because of the aiming condition of satellite, the receiving condition of radio wave or the like.

Thus, according to the positioning method of the present invention, it is not necessary to stop the vehicle at a specified point for a specified time in order to accumulate the position data according to the D-GPS for the purpose of raising accuracy and therefore it is possible to operate an autonomous vehicle efficiently and with high accuracy.

On the other hand, as for the process for detecting a boundary between mowed and unmowed areas, at S501 shown in FIG. 12, first such data as the mowing height of grasses or lawn at the object work area and the like are set and at S502 the angles of the swing arms 12a and 12b hanging the right and left sledge-like plates 13a and 13b which go up and down according to the height of grasses or lawn are detected by the rotating angle sensors 14a and 14b of the boundary detecting mechanism Next, the program steps to S503 where it is checked whether or not a predetermined time elapses. If it does not, the program goes to S502 where the angle data are detected again and stored. After that, when the predetermined time elapses and the required number of the angle data are accumulated, the program goes from S503 to S504. At S504 the accumulated right and left angle data are averaged respectively and they are converted into the heights of the right and left grasses or lawn respectively by referring to the data set at S501.

Further, the program goes from S504 to S505 wherein it is checked whether or not the difference between right and left grass heights is more than a specified value. If the difference is not more than the specified value, it is judged that there is no boundary and the program returns to S502. If the difference is more than the specified value, the program steps to S507 it is judged that a boundary between mowed and unmowed areas has been found and the the routine is terminated.

The D-GPS data communication between the stationary station 30 and the mobile station is performed in a packet data mode by the D-GPS communication routine shown in FIG. 13. In this data communication at S601 the GPS receiver 15 of the mobile station is initialized and at S602 the GPS receiver 33 of the stationary station is initialized by the data transmission through the radio communicating devices 16 and 36. Then the program goes to S603 where the differential information is obtained from the stationary station 30 through the radio communication.

Next, the program goes to S604 where the position of the vehicle is found by applying the differential information from the stationary station 30 to the position data obtained from the GPS receiver 15 of the mobile station and by performing a differential calculation thereto. After the position information thus obtained is transmitted to the running control section 56, the program returns to S603 and the next data process is repeated. In this case the differential calculation may be performed by the independent function of the receiver 15 of the mobile station itself, not by the differential information from the stationary station 30.

In the autonomous running control system according to the present invention, the position of the vehicle is detected by the position information from satellites and the correction information based on the position data of a known point. Additionally, on the other hand, the position of the vehicle is found based on the running histories since the reference point. Next, the difference between the position data from satellites and the position data based on the running histories at each moment when the position data is received from satellites is calculated and those differences obtained each time when the position data is received from satellites are averaged to obtain a correction value. Finally the current position of the vehicle is calculated by correcting the position data based on the running histories by the newest correction value. Therefore, in the autonomous running control system according to the present invention an accurate position of the vehicle can be found without stopping the vehicle, even when the position data from satellites does not have a sufficient accuracy. Thus, according to the present invention an efficient and accurate autonomous running can be achieved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An autonomous running control system for controlling a vehicle so as to run said vehicle autonomously, comprising:

a stationary station for receiving radio waves from a plurality of satellites at a stationary point where a position is known and for finding a position at said stationary point based on said radio waves;

differential information calculating means for calculating a difference between said position at said stationary point based on said radio waves and said known position in said stationary station and outputting said difference as a difference information;

differential information transmitting means for transmitting said difference information from said stationary station to said system of said vehicle;

first position finding means for receiving said radio waves from said plurality of satellites and for finding a first position at a point where said vehicle is running;

differential information receiving means for receiving said difference information from said stationary station;

first corrected position finding means for finding a corrected first position at said point where said vehicle is running based on said first position and said said differential information;

running history detecting means for detecting a running history of said vehicle;

second position finding means for finding a second position at said point where said vehicle is running based on said running history at the moment when said radio waves are received from said satellites;

differential values calculating means for calculating a differential value between said corrected first position and said second position at each moment when said radio waves are received from said satellites;

correction value calculating means for producing a correction value by averaging a predetermined number of said differential values; and final position finding means for finding a final position where said vehicle is currently located by correcting said second position with said correction value.

2. The system according to claim 1, wherein said running history detecting means comprise a running distance detecting device, a geomagnetic sensor and a position calculating device for calculating a position.

3. The system according to claim 1, wherein said running history detecting means comprise a running distance detecting device, a gyro compass and a position calculating device for calculating a position.

4. An autonomous running control method for controlling a vehicle so as to run said vehicle autonomously, the method comprising the steps of:

receiving radio waves from a plurality of satellites at a stationary point where a position is known and for finding a position at said stationary point based on said radio waves;

calculating a difference between said position at said stationary point based on said radio waves and said known position and outputting said difference as a difference information;

transmitting said difference information;

receiving said radio waves from said plurality of satellites and finding a first position at a point where said vehicle is running;

receiving said difference information;

finding a corrected first position at said point where said vehicle is running based on said first position and said differential information;

detecting a running history of said vehicle;

finding a second position at said point where said vehicle is running based on said running history at the moment when said radio waves are received from said satellites;

calculating a differential value between said corrected first position and said second position at each moment when said radio waves are received from said satellites;

producing a correction value by averaging a predetermined number of said differential values; and finding a final position where said vehicle is currently located by way of correcting said second position with said correction value.

* * * * *